United States Patent [19]

Ludwig et al.

[11] 4,196,472

[45] Apr. 1, 1980

[54] STALL CONTROL APPARATUS FOR AXIAL FLOW COMPRESSORS

[75] Inventors: Gary R. Ludwig, East Amherst; Rudy H. Arendt, South Wales, both of N.Y.

[73] Assignee: Calspan Corporation, Buffalo, N.Y.

[21] Appl. No.: 831,706

[22] Filed: Sep. 9, 1977

[51] Int. Cl.$^2$ .......................... F02C 9/14; F04D 27/02
[52] U.S. Cl. ..................................... 364/431; 60/39.29; 340/27 SS; 415/17; 415/39
[58] Field of Search .................... 415/17, 39; 364/431; 60/39.29; 340/27 SS; 73/115, 116, 117

[56] References Cited

U.S. PATENT DOCUMENTS

| | | | |
|---|---|---|---|
| 3,852,958 | 12/1974 | Adams et al. | 340/27 SS |
| 3,867,717 | 2/1975 | Moehring et al. | 364/431 |
| 3,868,625 | 2/1975 | Speigner et al. | 340/27 SS |
| 3,872,292 | 3/1975 | Dawson, Jr. | 340/27 SS |
| 3,935,558 | 1/1976 | Miller et al. | 340/27 SS |
| 3,987,620 | 10/1976 | Giordano et al. | 364/431 |

*Primary Examiner*—Felix D. Gruber
*Attorney, Agent, or Firm*—Allen J. Jaffe; David J. Zobkiw

[57] ABSTRACT

A stall control system for axial flow compressors incorporating: a plurality of pressure transducers for developing signals indicative of the nonsteady pressure variations within the compressor and wherein these signals are separately filtered and rectified; analog comparators and gate comparators for each such signal to develop an output indicative of the difference between each of the signals and an adjusted pressure reference signal which is derived from the pressure rise across the compressor; a logic circuit for generating an actuating signal if any one of such signals is higher than the reference signal for controlling the opening of a gate which passes the combined pressure signals to an integrator which develops an output control signal to take corrective action in the presence of rotating stall within the compressor: an adjustable time delay circuit providing long and short decay times to prevent over-control.

12 Claims, 3 Drawing Figures

STALL CONTROL APPARATUS FOR AXIAL FLOW COMPRESSORS

BACKGROUND OF THE INVENTION

The present invention relates to a stall control apparatus for axial flow compressors and, more particularly, to a rotating stall control system for such compressors which are components of turbo-propulsion systems.

The optimum performance of a turbo-propulsion system is usually achieved when the compressor is operating near its maximum pressure ratio; however, this optimum is generally not attainable because it occurs close to compressor stall and resultant unstable flow conditions. In practice a stall safety margin is provided to prevent the compressor from developing destructive unsteady flow phenomena such as rotating stall and surge. This margin is usually achieved by prescheduling the engine controls. That is, by setting the various fuel flow rates, pressures and the like within predetermined limits. Unfortunately this approach can lead to large stall safety margins to keep the engine out of stall under all possible transient and steady flight conditions, which results in significant engine performance penalties in terms of efficiency.

SUMMARY OF THE INVENTION

The foregoing disadvantages, as well as others, are overcome according to the teachings of the present invention, which provides a control system that can detect or sense incipient destructive unsteady flow in the compressor and take corrective action to thereby eliminate the need for prescheduling which results in beneficial gains in engine performance.

In many instances of engine failure, rotating stall has been identified as a precursor to destructive unsteady flow within the engine. Moreover, blade fatigue considerations will not allow a compressor to operate for prolonged periods in a large-amplitude rotating stall mode. It is therefore an objective of the present invention to detect the onset of rotating compressor stall and keep the engine from operating in the rotating stall mode.

Basically, the present invention performs the following functions:

1. detects an unambiguous signal indicative of the onset of rotating stall;

2. processes such signal such that control action on some compressor variable is taken which will eliminate the imminent rotating stall, such control action occurring quickly (on the order of milliseconds) so that its effect on the compressor is almost immediate;

3. permits return to normal compressor operation after the rotating shall dies away such that the control has no effect on normal compressor operation, however, the return to normal operation need not be as rapid as the initial control action.

According to the present invention, the requirement for a fast acting control system is accomplished by sensing pressure fluctuations within the compressor itself and employing these sensed signals to provide direct mechanical action on the compressor geometry (such as, for example, stator stagger angle or bleed port openings). The control signal can alternately be used to provide corrective action on other turbine engine variables, such as fuel flow or exhaust nozzle area.

BRIEF DESCRIPTION OF THE DRAWINGS

For a fuller understanding of the present invention reference should now be had to the following detailed description thereof taken in conjunction with the accompanying drawings, wherein.

DESCRIPTION OF THE PREFERRED EMBODIMENT

Although, for ease in explanation, the control system according to the present invention will be described as applied to a conventional J-85-5 turbojet engine, it is to be understood that this is for illustrative purposes only and should not be construed as limiting the present invention to any specific turbine engine compressor.

Figure 1:
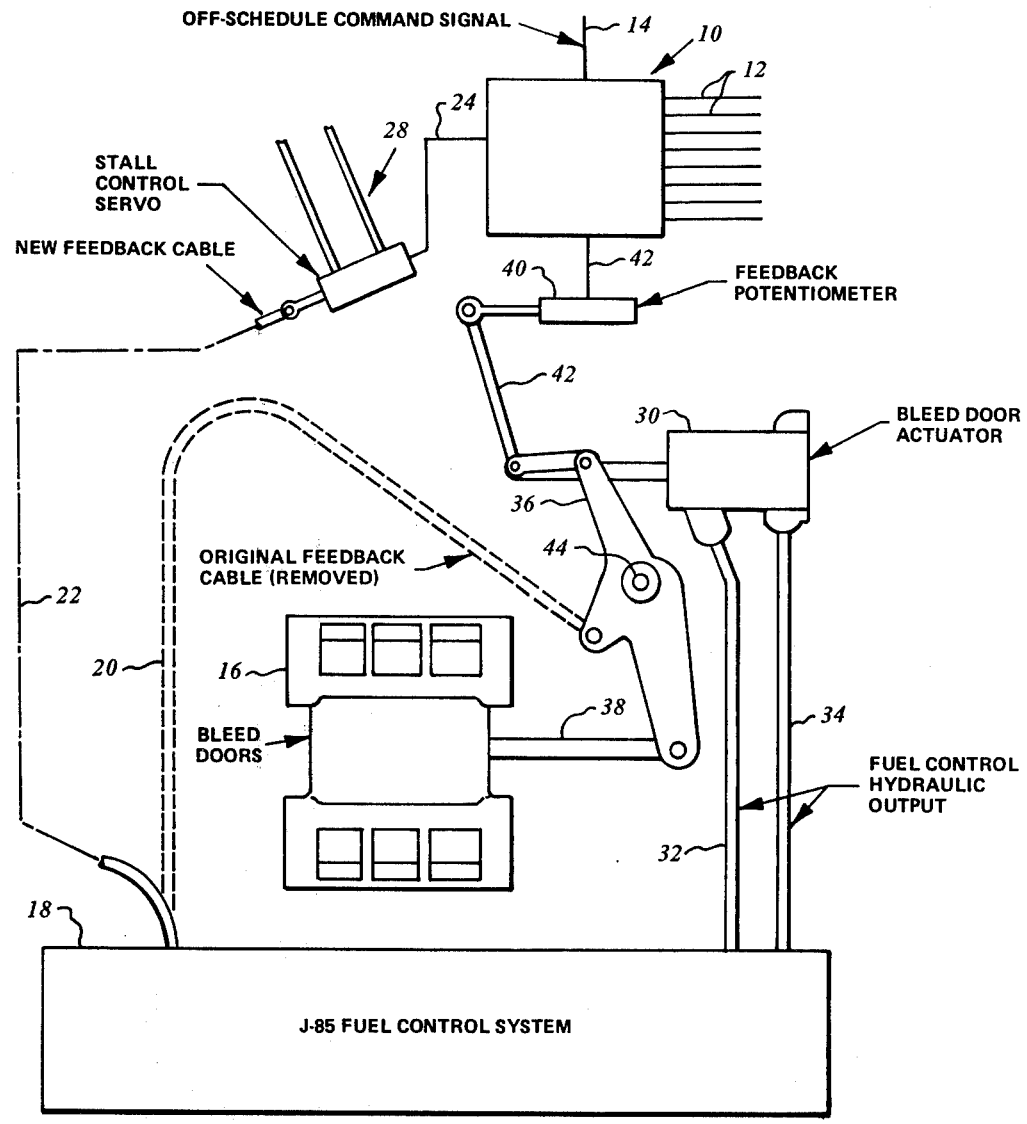
FIG. 1 is a partial schematic view of the interacting elements of the present invention as applied, illustratively, to a conventional turbo system.

Referring now to the drawings and, more particularly, to FIG. 1, the rotating stall control system is depicted schematically at 10 to which are applied a series of sensed input pressure signals depicted collectively at 12 which may be conveniently derived from conventional pressure sensors mounted within the compressor, as will be discussed in greater detail hereinbelow. Control system 10 also has provision for an off schedule command input signal at 14 to effectuate non-automatic control of the variable geometry feature of the compressor to be controlled, which feature may comprise inlet guide vanes (not illustrated) and bleed doors illustratively depicted at 16. The command signal is useful for generating stall to permit verification of the effectiveness of the control system. The positions of the guide vanes and bleed doors on the J-85 compressors are normally controlled by the fuel or engine control system 18 as a function of engine rpm and inlet air temperature. In the unmodified J-85 engine a feedback cable 20 (illustrated in dashed lines) between the fuel control system 18 and the actuators for the bleed doors was employed to ensure that the proper position of the doors was maintained. In accordance with the present invention conventional cable 20 is replaced with a cable 22 which is operated by the stall control system 10. This cable replacement need be the only change made in the original fuel or engine control system of the J-85. The bleed doors 16 continue to be operated by the fuel control but with the present invention the response can now be modified by the influence of an output control signal at 24 from the stall control system 10. As will become apparent the stall control signal deceives the engine fuel control into performing the desired stall control functions via feedback cable 22 and a hydraulic servo 28 responsive to the output signal at 24. In the conventional control of the bleed doors 16 a hydraulic actuator 30 responsive to the pressure differential in lines 32 and 34 emanating from a bleed door servo in the fuel control system 18 drives a bell crank 36 causing bleed door shaft 38 to move linearly for opening and closing the bleed doors.

Under normal engine operating conditions, it is necessary that the modified engine follow a variable geometry schedule (bleed door opening and closing schedule) that is the same as the conventional engine. To this end a precision linear potentiometer 40 is mounted on the bell crank 36 by means of a shaft 43 connected to an arm of the bell crank for responding angular position thereof about the central fulcrum or pivot point 44. The potentiometer 40 provides an electrical signal at 42 which, in the absence of rotating stall, commands the servo 28 through system 10 to move the new feedback cable 22 within the fuel control system 18 to the normal position of the old cable 20. Thus, the normal operation schedule is maintained; however, if stall does occur, a stall correction signal is combined with the potentiometer signal to command a new bleed door position to counteract the stall condition, as will become apparent hereinbelow. An operating description of the J-85 engine is not presented here but can be obtained from other publications such as the J-85 Training Guide (SEI-427, August 1973).

Figure 2:
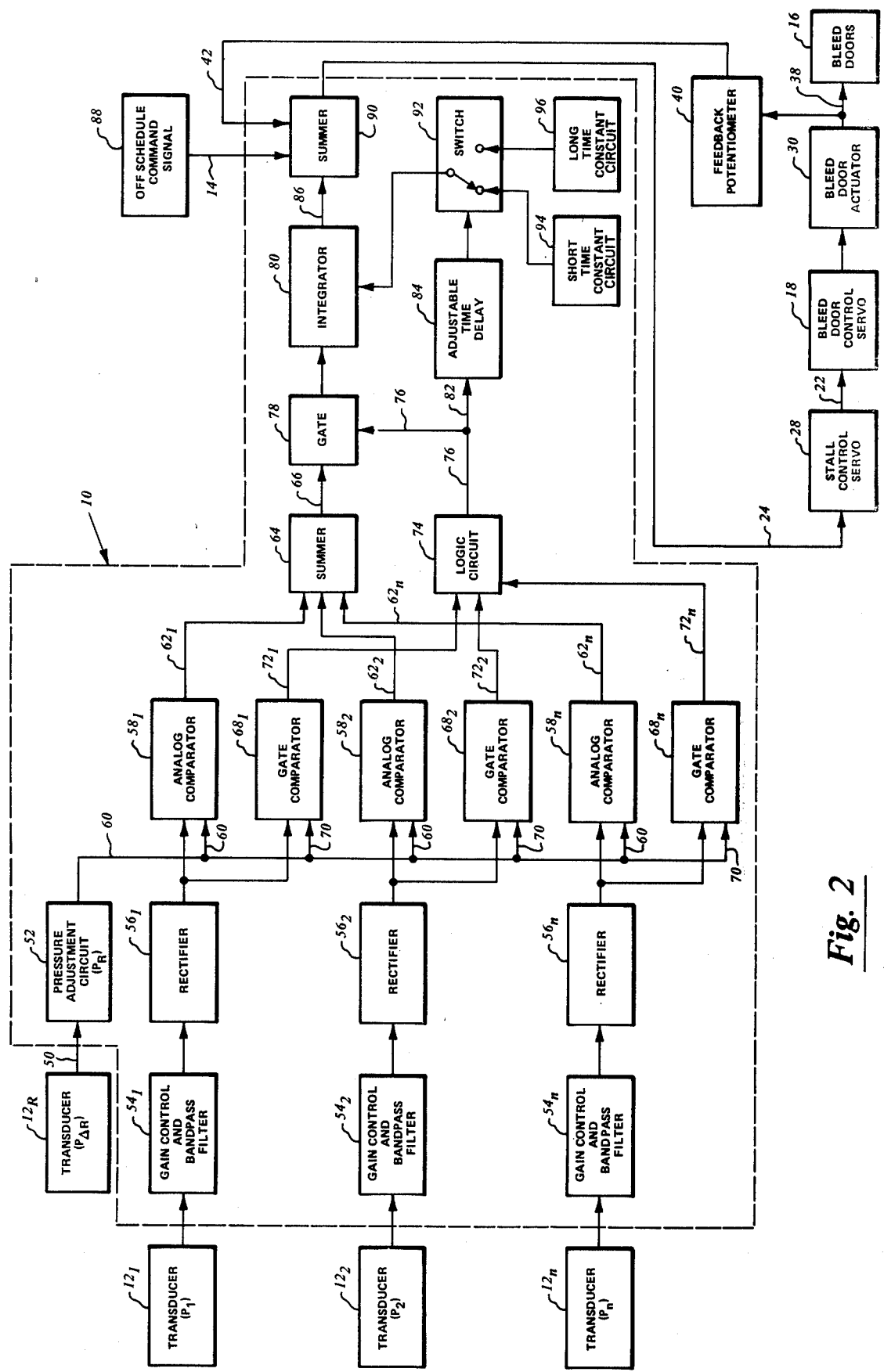
FIG. 2 is a schematic flow diagram in block form illustrating the components of the present invention.
Figure 3:
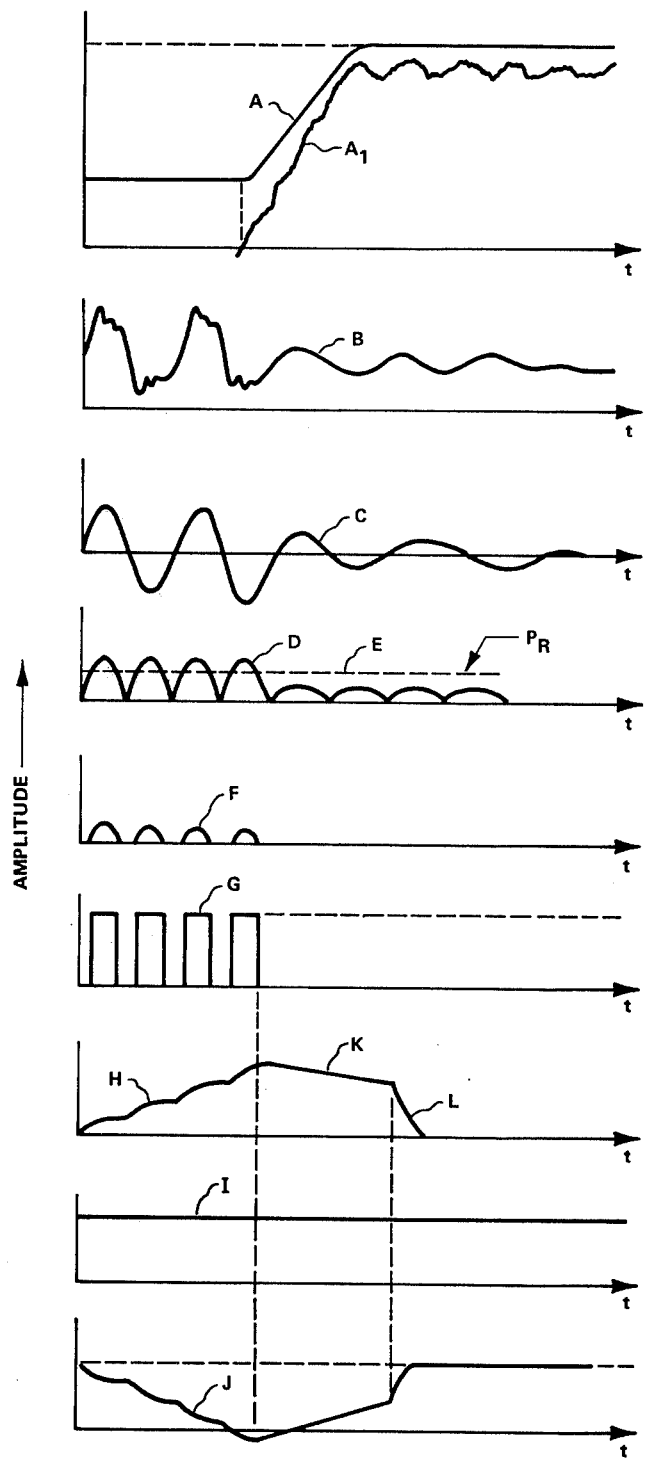
FIG. 3 is a graphical representation of the electronic signals at various stages or locations within the control system according to the present invention.

With the aid of FIGS. 2 and 3 a more detailed description of the stall control system will now follow. Suitable pressure transducers $P_1$ through $P_n$ are mounted in the compressor to measure the pressure fluctuations at the inner surface of the compressor casing at various axial locations and are schematically depicted at $12_1, 12_2 \ldots 12_n$ in FIG. 2. Exemplary locations for the transducers in the J-85 compressor are as follows:

1. Near the first stage rotor mid-chord;
2. Near the quarter—chord of the first stage stator;
3. Near the trailing edge of the second stage rotor; and
4. Between the second stage stator trailing edge and the third stage rotor leading edge.

The pressure transducers may be standard and of the type supplied by PCP Piezotronics, Inc.

A reference pressure transducer $12_R$ is provided to measure the static pressure rise across the compressor. The output of transducer $12_R$ is fed via line 50 to a reference pressure adjustment circuit 52 which functions to maintain the reference pressure signal above a prescribed minimum positive value, since it has been found that low or negative reference pressure signals can erroneously trigger a stall control action in the absence of a true rotating stall condition. The circuit 52 can simply be a diode and a bias voltage to maintain the signal above a predetermined value as depicted graphically at A in FIG. 3. The signal may be conditioned by a critically damped low pass filter so that only slowly varying changes in the static pressure across the compressor ($A_1$) cause a change therein. This signal is used to compensate the stall control system for changes in compressor operating conditions such as rotational speed and altitude.

The processing of the signals indicative of the sensed pressures, $P_1, P_2 \ldots P_n$ occurs in parallel and through separate but similar channels; it will suffice, therefore, to describe one channel as representative of all. The output of transducers $12_1, 12_2 \ldots 12_n$ are fed to standard gain control and bandpass filters $54_1, 54_2 \ldots 54_n$ to remove steady state and low frequency variations (which are not relevant to rotating stall conditions) and high frequency components such as instrument noise and rotor blade passage effects. A typical input is shown at B in FIG. 3 with the output signal at C therein.

The signals from $54_1, 54_2 \ldots 54_n$ are then suitably rectified by elements $56_1, 56_2 \ldots 56_n$ to obtain an absolute value signal as depicted at D in FIG. 3 with the pressure reference signal from 52 superimposed as $P_R$ at E therein.

The rectified signals are then fed to voltage comparator circuits $58_1, 58_2 \ldots 58_n$ each of which also receives as an input via line 60 the pressure reference signal from element 52. Comparators $58_1, 58_2 \ldots 58_n$ function to deliver a signal in lines $62_1, 62_2 \ldots 62_n$ that represents only those portions of the rectified signals from $56_1, 56_2 \ldots 56_n$ which exceed the pressure reference signal, as depicted at F in FIG. 3. The signals in lines $62_1, 62_2 \ldots 62_n$ are summed by summing circuit 64 to produce a composite analog signal in line 66 representing the combined amount by which each pressure sensor or transducer signal exceeds the reference pressure signal.

The rectified signals from $56_1, 56_2 \ldots 56_n$ are also fed to comparators $68_1, 68_2 \ldots 68_n$ each of which also receives as an input via branch line 70 the pressure reference signal from element 52. Comparators $68_1, 68_2 \ldots 68_n$ function to deliver signals in lines $72_1, 72_2 \ldots 72_n$ whenever the rectified input signal is greater than the reference pressure signal, such signal being a relatively high d.c. voltage as indicated at G in FIG. 3. The signals in lines $72_1, 72_2 \ldots 72_n$ are fed to a gate actuating logic circuit 74, which functions to generate a high output in line 76 if any of the signals in lines $72_1, 72_2 \ldots 72_n$ has exceeded the reference pressure signal in lines 60 and 70. When all of the signals in lines $72_1, 72_2 \ldots 72_n$ are low, a low output is developed. The logic circuit may comprise of a plurality of integrated logic circuit packs which are interconnected to perform a logic "OR" function. To accommodate a large number of input signals, such as ten, and to account for input and output signals polarity, half of the integrated circuits may consist of hex inverters whereas the other half may consist of input "nand" gates. These integrated circuits are well known and are commercially available as SN7404 and SN7430.

The high output from logic circuit 74 is employed via line 76 to actuate a gate 78 which permits the signal in line 66 to be fed to an integrator 80, the gain and decay rate of which is independently adjustable as will become apparent hereinbelow. The gate 78 ensures that the integrator is referenced to zero voltage whenever the sensed pressure signals from elements $56_1, 56_2 \ldots 56_n$ are below the referenced pressure level in lines 60 and 70. The actuating signal in line 76 is also fed via branch 82 to an adjustable time delay 84 for the integrator, as will become apparent.

The output from integrator 80 is a signal on line 86 which is obtained by integrating only those portions of the composite pressure sensor signals whose absolute values delivered by rectifiers $56_1, 56_2 \ldots 56_n$ exceed the reference pressure level in line 60. With proper selection of the reference pressure level the integrator output is nonzero only when stall is occurring or is very close to occurring in the compressor. When stall does occur the integrator output increases rapidly to provide a stall correction signal that is proportional to the severity of the stall. The signal in line 86 is summed in opposition with a command position signal from potentiometer 40 via line 42 to summer 90. This command position signal is derived from the primary engine control system and represents the normal (unstalled) operating schedule for the variable geometry (in this example—the bleed doors) on the compressor.

The output of the summer provides a control signal via line 24 to correct the stalled condition. In the example given, the control signal is applied to the stall control servo which adjusts the bleed door control servo within the J-85 fuel control system 18 which in turn causes the bleed door actuator 30 to move the bleed doors 16 away from the stalled position. When the stall has been removed, the pressure signals from rectifiers $56_1$, $56_2$ . . . $56_n$ decrease below the reference pressure level, causing the integrator input to drop to zero. The output voltage of the integrator then decays in a way which is controlled by the integrator decay circuitry comprised of time delay 84, and electronic switch 92 and two time constant—circuits short 94 and long 96. When the integrator output voltage has decayed sufficiently, the original signal from potentiometer 40 resumes control and allows the engine to resume normal operation which, for the example given, permits the bleed doors to return to their original position.

The integrator decay circuitry functions to prevent over-control of the engine after stall has been eliminated. It has been found if the integrator decay time constant is set long enough, the control system functions to efficiently correct the rotating stall; however, operation with a long delay time constant will cause the controlled variable to overshoot when the primary engine controls command a change from a position inside the rotating stall boundary to one closer to the boundary or outside thereof. Under this condition the undecayed portion of the stall control signal will reinforce the engine control signal. Thus, long decay constants will increase the magnitude and duration of the overshoot. In the present system this problem is overcome by the incorporation of two time constants. One with a long-time decay in the presence of rotating stall and the other with a short time decay once the stall has disappeared for a predetermined short period. Stall pressures in excess of the reference pressure level generate signals in line 82 causing switch 92 to open thereby establishing the long time constant. The long time constant is maintained as long as the stall pressure signal is in excess of the reference pressure level. If the stall pressure falls below the reference pressure level, the integrator is switched back to the short time constant after a specific time delay. Thus, a fast recovery time (short time constant) is selected only if the pressure signal remains below the reference pressure level longer than the delay.

More specifically, the time delay circuit 84 functions to keep the integrator 80 in the long decay mode for a small but known and adjustable time interval after stall disappears; it does not, however, delay the transition to the long decay mode when stall is detected. The circuit 84 may consist of discrete electronic components interconnected such that a capacitor is charged and discharged, in first order fashion, when the input is applied and removed from the circuit. A diode causes the capacitor to discharge very quickly, in comparison to the change time, and prevents a time delay at stall inception.

An operational amplifier compares the voltage on the capacitor with a preset reference level, and signals when the charge voltage exceeds the preset level. Due to the combined affect of these circuit elements, the integrator immediately reverts to the long decay time mode when stall is first detected, and remains in this mode for a known delay time after stall disappears.

Electronic switch 92 may consist of an integrated circuit such as P/N CAG30 manufactured by Teledyne Crystalonics and may include a field effect transistor (FET) and appropriate drive circuitry, as is well known. Switch 92 is preferably capable of switching analog voltages up to ±10 volts at current levels of ±20 ma. Standard driver circuitry incorporated in the unit permits standard logic levels to operate the device.

The integrator decay time is controlled by variable resistors which are switched in parallel with the integrator capacitor by the action of electronic switches. The integrator remains in the long decay mode when a large resistance is switched in parallel with the integrating capacitor, and reverts to the fast decay mode when a small resistance is switched into the circuit.

With the aid of FIGS. 2 and 3 the operation of the present stall control system can be summarized as follows:

The unsteady pressure signals from transducers $12_1$, $12_2$ . . . $12_n$, each one of which may be depicted as at B in FIG. 3, are filtered and rectified in parallel to develop signals each of which may be depicted as at C and D, respectively, in FIG. 3, and are independently compared by analog comparators $58_1$, $58_2$ . . . $58_n$ with an adjusted pressure reference signal, depicted at A in FIG. 3 which is proportional to the compressor pressure ratio or any other appropriate signal indicative of a rotating stall threshold. The outputs of each analog comparator are combined to generate a composite signal that is a function of the pressure variations within the compressor that are above the reference pressure level, as indicated at F in FIG. 3, which may be passed through gate 78 for corrective action depending upon the gate control signal emanating from logic circuit 74 depicted at G in FIG. 3. This signal is nonzero if any one of the filtered and rectified pressure signals is greater than the pressure reference signal. A signal greater than zero from logic circuit 74 will open gate 78 and allow the composite signal from summer 64 (F in FIG. 3) to be integrated at 80 to generate a control signal depicted at H in FIG. 3, the slope steepness of which being a function of the severity of the stall (the degree in which the pressure signals exceed the reference pressure level). The control signal is summed with the normal operating command signal in 90 as depicted at I in FIG. 3 to develop a composite control signal in line 24, depicted at J in FIG. 3. This signal is employed to trigger correction of the variable geometry feature of the compressor to a position which inhibits the stall. For the J-85 compressor example given and for similar compressors the variable geometry feature may be the compressor bleed doors 16 operated by the bleed door actuator 30 through the bleed door servo in the fuel control system 18 as influenced by the stall control servo 28 under the control of the signal in line 24.

When the stall has been corrected the composite pressure signal from summer 64 falls below the reference pressure level with the input to integrator going to zero and the output thereof decaying to zero at two rates. The first rate is determined by the decay of the long time constant 96 and the second rate is determined by the decay of the short time constant 94, as depicted at K and L, respectively, in FIG. 3. Compressor operation then resumes under the normal command signals emanating from feedback potentiometer 40 and the bleed doors resume their original position.

For a more detailed discussion of the theory and of earlier forms of the present control system reference may be had to the following technical reports:

(1) An Investigation of Rotating Stall Phenomena in Turbine Engine Compressors by G. R. Ludwig, J.

P. Nenni and R. S. Rice, Jr; Technical Report AFAPL-TR-70-26 dated May 1970; and (2) Investigation of Rotating Stall in Axial Flow Compressors and the Development of a Prototype Rotating Stall Control System by G. R. Ludwig, J. P. Nenni and R. H. Arendt; Technical Report AFAPL-TR-73-45 dated May 1973 as well as the report upon which much of the technical content of the present invention is derived—Investigation of Rotating Stall Phenomena in Axial Flow Compressors Volume III—Development of a Rotating Stall Control System; Technical Report AFAPL-TR-76-48 dated June 1976 and printed Oct. 1, 1976.

The control system of the present invention, although generally similar to that of report (2) above, differs therefrom in the following significant respects;

1. The transducer pressure signals $P_{(1)}, P_{(2)} \ldots P_{(n)}$ are processed in parallel by means of separate filters and rectifiers for each signal and the individual signals are separately compared with the reference pressure signal; it has been found that summing the pressure signals prior to processing could result in a situation wherein the noise content of the summed signal could mask the presence of a stall signal from any one pressure signal. This could be particularly unsatisfactory where a pressure sensor in one upstream region of the flow may provide the first indication of approaching stall while the remaining sensors indicate acceptable conditions;

2. In the previous system the reference pressure was set at a constant level, whereas the present system includes circuitry to cause the pressure reference to vary as a linear function of the compressor pressure ratio or any other suitable signal and is processed through a second order critically damped filter to permit the reference pressure to change only in response to slowly varying parameters. In this manner the essential parameter upon which a corrective action is based is made a function of actual engine operating conditions; and, more specifically;

3. The control system has been applied to an existing turbo engine compressor with but one minor modification thereto.

Although a preferred embodiment of the present invention has been disclosed and described, changes will obviously occur to those skilled in the art. For example, the variable geometry or other feature of the compressor to be controlled need not be the bleed doors, but could be instead other controllable features such as the stagger angle of the stators. In which case the signal emanating from integrator 80 would be applied to adjust the stator vanes. It is therefore intended that the present invention is to be limited only by the scope of the appended claims.

We claim:

1. A stall control system for compressors, comprising:
   (a) first means for generating a varying reference pressure signal in response to operating conditions within a compressor,
   (b) a plurality of pressure responsive elements located within the housing of a compressor for developing signals indicative of the nonsteady pressure variations therein,
   (c) separate means associated with each one of said elements for separately filtering and rectifying each of said signals,
   (d) second means for independently comparing each one of said filtered and rectified signals with said reference pressure signal and developing an intermediate control signal if any one of said filtered and rectified signals exceeds said reference pressure signal,
   (e) third means for developing a composite signal indicative of the combined amount by which each of said signals exceeds said reference pressure signal,
   (f) fourth means responsive to said intermediate control signal for integrating said composite signal to generate a control signal for influencing the actuation of a controlled variable within a compressor, and
   (g) means for varying the decay rate of said control signal.

2. The system according to claim 1, wherein;
   (h) said second means comprises comparators and a logic circuit, and
   (i) said fourth means comprises a gate and an integrator.

3. The system according to claim 1, wherein;
   (h) said means for varying the decay rate of said control signal comprises an adjustable time delay controlling short and long time constant circuits.

4. In a turboengine system having a compressor, a controlled variable within the compressor, an actuator for said controlled variable, an engine control system having as one of its outputs means for controlling said actuator during normal operation, the improvement of stall control means located between said engine system output and said actuator for controlling movement thereof in response to unsteady pressure variations within said compressor, comprising;
   (a) a variable reference pressure signal responsive to operating conditions within said compressor,
   (b) a plurality of pressure responsive elements located within the housing of said compressor for developing signals indicative of the nonsteady pressure variations therein,
   (c) separate filters and rectifiers associated with each of said elements developing separate processed signals,
   (d) comparators for each of said processed signals for delivering a plurality of signals the amplitude of each of which is a function of the difference between said reference pressure signal and each of said processed signals,
   (e) gate comparators for independently comparing each one of said processed signals with said reference pressure signal,
   (f) logic circuits responsive to the output of said gate comparator for developing an intermediate control signal if any one of said processed signals exceeds said reference pressure signal,
   (g) a gate responsive to said intermediate control signal for passing said plurality of signals from said comparator, and
   (h) an integrator for integrating the output of said gate and delivering a control signal for said actuator.

5. The system according to claim 4, further comprising;
   (i) a time delay circuit coacting with said integrator for controlling the decay rate of said control signal.

6. The system according to claim 5, wherein said time delay circuit includes;
   (j) a long time constant circuit, and
   (k) a short time constant circuit operative to increase the decay rate of said control signal after said intermediate control signal goes to zero for a predetermined time.

7. The system according to claim 6, wherein;
(l) said controlled variable comprises bleed doors.

8. In a turboengine system having a compressor, a controlled variable within the compressor, an actuator for said controlled variable, an engine control system having as one of its outputs means for controlling said actuator during normal operation, the improvement of stall control means located between said engine system output and said actuator for controlling movement thereof in response to unsteady pressure variations sensed at multiple locations within said compressor and compared with a reference pressure signal which varies as a function of operating conditions within said compressor, said stall control means comprising;
(a) a variable reference pressure signal responsive to operating conditions within said compressor,
(b) a plurality of pressure responsive transducers located within said compressor for generating signals indicative of the nonsteady pressure variations therein,
(c) parallel processing channels for independently filtering and rectifying said signals, and
(d) means for independently comparing each of said filtered and rectified signals with said pressure reference signal for generating an intermediate control signal.

9. The system according to claim 8, further comprising;
(e) means for independently comparing each of said filtered and rectified signals with said pressure reference signal for generating a composite analog signal; and
(f) means responsive to said intermediate control signal for passing said composite signal.

10. The system according to claim 9, further comprising;
(g) an integrator responsive to the output of said last mentioned means for delivering a control signal for said actuator.

11. The system according to claim 10, further comprising;
(h) means for increasing the decay rate of said control signal after a predetermined delay.

12. The system according to claim 11, wherein;
(i) said controlled variable comprises bleed doors.

* * * * *